United States Patent [19]

Waggoner et al.

[11] Patent Number: 5,110,896
[45] Date of Patent: May 5, 1992

[54] THERMOTROPIC LIQUID CRYSTALLINE POLYESTER COMPOSITIONS

[75] Inventors: Marion G. Waggoner, Hockessin; Michael R. Samuels, Wilmington, both of Del.

[73] Assignee: E. I. Du Pont de Nemours and Company, Wilmington, Del.

[21] Appl. No.: 625,132

[22] Filed: Dec. 10, 1990

[51] Int. Cl.⁵ ............................................. C08G 63/189
[52] U.S. Cl. .................... 528/190; 524/494; 524/601
[58] Field of Search ........................ 528/190; 524/494

[56] References Cited

U.S. PATENT DOCUMENTS

| | | | |
|---|---|---|---|
| 3,637,595 | 1/1972 | Cottis et al. | 260/47 C |
| 3,703,495 | 11/1972 | Jackson, Jr. | 260/30.6 R |
| 4,067,852 | 1/1978 | Calundann | 260/47 |
| 4,118,372 | 10/1978 | Schaefgen | 528/190 |
| 4,169,933 | 10/1979 | Jackson, Jr. et al. | 528/190 |
| 4,247,514 | 1/1981 | Luise | 264/345 |
| 4,485,230 | 11/1984 | Yu | 528/125 |
| 4,611,025 | 9/1986 | Akkapeddi et al. | 524/449 |
| 4,626,557 | 12/1986 | Duska et al. | 523/100 |
| 4,639,504 | 1/1987 | Cottis | 528/176 |
| 4,713,435 | 12/1987 | Sugimoto et al. | 528/179 |
| 4,742,149 | 5/1988 | Finestone | 528/179 |
| 4,849,499 | 7/1989 | Fagerburg et al. | 528/298 |
| 4,851,467 | 7/1989 | Frayer | 524/495 |
| 4,851,497 | 7/1989 | Wakui et al. | 528/176 |
| 4,900,804 | 2/1990 | Wakui et al. | 528/332 |

FOREIGN PATENT DOCUMENTS

62-81448 7/1987 Japan.
1-215823 1/1989 Japan.

OTHER PUBLICATIONS

Liquid Crystal Polymers. XI. Liquid Crystal Aromatic Polyesters: Early History and Future Trends by W. J. Jackson, Jr., 1989, vol. 169, pp. 23-49.

*Primary Examiner*—Paul R. Michl
*Assistant Examiner*—Yong S. Lee

[57] ABSTRACT

This invention relates to thermotropic liquid crystalline polyester compositions containing recurring units derived from hydroquinone, 4-4'-dihydroxybiphenyl, terephthalic acid, 2,6-naphthalenedicarboxylic acid, and 4-hydroxybenzoic acid which are characterized as having melting points less than 365° C., breaking elongations greater than or equal to 1.5%, and heat distortion temperatures greater than 200° C.

This invention further relates to the same compositions containing 20 to 40 weight percent of at least one glass reinforcing/filling agent and which are characterized as having melting points less than 365° C., breaking elongations greater than or equal to 2.0%, and heat distortion temperatures greater than 230° C.

The compositions are useful as films, fibers, and shaped or molded articles.

11 Claims, No Drawings

THERMOTROPIC LIQUID CRYSTALLINE POLYESTER COMPOSITIONS

BACKGROUND

1. Technical Field

This invention relates to novel thermotropic liquid crystalline polyester compositions prepared from hydroquinone, 4,4'-dihydroxybiphenyl, terephthalic acid, 2,6-naphthalenedicarboxylic acid, and 4-hydroxybenzoic acid. The compositions are characterized as having melting points less than 365° C., breaking elongations greater than or equal to 1.5%, and heat distortion temperatures greater than 200° C.

This invention further relates to novel glass reinforced/filled thermotropic liquid crystalline polyester compositions prepared from the same components given above and additionally containing 20 to 40 weight percent of at least one glass reinforcing/filling agent. These glass reinforced/filled compositions are characterized as having melting points less than 365° C., breaking elongations greater than or equal to 2.0%, and heat distortion temperatures greater than 230° C.

The thermotropic liquid crystalline polyester compositions of the present invention and the glass reinforced/filled thermotropic liquid crystalline polyesters of the present invention are advantageous because they have melting points less than 365° C., which allows them to be manufactured and processed without undergoing significant thermal degradation.

The thermotropic liquid crystalline polyester compositions of the present invention are further advantageous because they have braking elongations greater than or equal to 1.5%; the glass reinforced/filled thermotropic liquid crystalline polyester compositions of the present invention are further advantageous because they have breaking elongations greater than or equal to 2.0%. Breaking elongation is a measure of the toughness of a composition and increasing values are highly desirable. Breaking elongations in molded parts greater than or equal to 1.5% (or greater than or equal to 2.0% for 20 to 40 weight percent glass reinforced/filled compositions) are rare in liquid crystalline polyester compositions and are very desirable for many high temperature end-use applications.

The liquid crystalline polyester compositions of the present invention are also advantageous because they have heat distortion temperatures greater than 200° C.; the glass reinforced/filled liquid crystalline polyester compositions of the present invention are also advantageous because they have heat distortion temperatures greater than 230° C. Such heat distortion temperatures make both types of compositions useful for many high temperature end-use applications. Examples of high temperature end-use applications include, but are not limited to, electrical end-use applications, such as those involving assembly with high temperature soldering techniques (such as vapor phase reflow and infrared soldering) and automotive end-use applications.

The thermotropic liquid crystalline polyester compositions of the present invention can be formed into fibers, films, monofilaments, molded articles, and shaped articles. The glass reinforced/filled thermotropic liquid crystalline polyester compositions of the present invention can be formed into molded articles or shaped articles. Both types of compositions are useful in applications where it is desired to use a polymer composition having a high breaking elongation, a melting point less than 365° C., and a high heat distortion temperature.

2. Background Art

U.S. Pat. No. 4,849,499 discloses wholly aromatic polyesters prepared from approximately equimolar amounts of a diacid component, which is a mixture of 2,6-naphthalenedicarboxylic acid and terephthalic acid, and an aromatic diol component comprising 4,4'-dihydroxybiphenyl, and which are modified with 10–80 mole percent p-hydroxybenzoic acid. The reference discloses that minor amounts of additional modifying dicarboxylic acid units, such as isophthalic acid and other naphthalenedicarboxylic acids, and/or aromatic diol monomer units, such as hydroquinone and resorcinol, may be present in the polyesters disclosed therein. However, there is no specific example provided wherein hydroquinone is used in preparing the polyesters exemplified therein. Further, there is no specific teaching that wholly aromatic polyesters prepared from 2,6-naphthalenedicarboxylic acid, terephthalic acid, 4,4'-dihydroxybiphenyl, p-hydroxybenzoic acid, and hydroquinone would have melting points less than 365° C. In fact, none of the polymers prepared in examples 3, 4, and 5 of this reference had a melting point, as measured by DSC, less than 400° C. The polymers of Examples 3, 4, and 5 were all prepared from 2,6-naphthalenedicarboxylic acid, terephthalic acid, 4,4'-bis-acetoxybiphenyl, and p-acetoxybenzoic acid. There is no indication that the addition of hydroquinone to such polymers would result in the melting point of such polymers being less than 365° C. Further, there is no teaching provided in this reference that the compositions described therein have heat distortion temperatures greater than 200° C. and breaking elongations greater than or equal to 1.5%. There is also no teaching that glass reinforced/filled compositions having high breaking elongations, high heat distortion temperatures, and relatively low melting points can be produced.

U.S. Pat. No. 4,169,933 discloses liquid crystalline polyesters prepared from terephthalic acid, 2,6-naphthalenedicarboxylic acid, a diacyl ester of hydroquinone, and acyloxybenzoic acid. There is no teaching of the use of 4,4'-dihydroxybiphenyl in the polyesters disclosed in this reference. Further, there is no teaching that the compositions described in this reference have heat distortion temperatures greater than 200° C. and breaking elongations greater than or equal to 1.5%. There is further no disclosure in this reference on how to produce a glass reinforced/filled compositions having high heat distortion temperatures, high breaking elongations, and relatively low melting points.

U.S. Pat. No. 4,067,852 discloses aromatic polyesters consisting essentially of recurring units of I, II, and III wherein (I) is 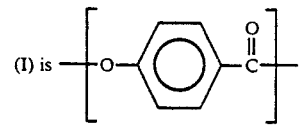

(II) is 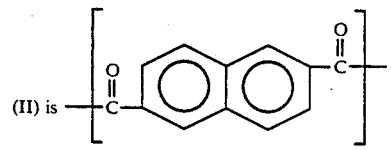

-continued
and (III) is 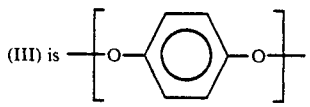

(I) may be 4-hydroxybenzoic acid, (II) may be 2,6-naphthalenedicarboxylic acid, and (III) may be hydroquinone. This reference specifically teaches away from the compositions of the present invention in that at column 4, lines 25-27, it is stated that "It is essential that moiety II consists of a pair of fused benzene rings . . . rather than a single divalent benzene ring." The reference continues by stating, in column 4, lines 27-34 that "For instance, it has been found that if one were to substitute single benzene rings for a substantial portion of the naphthalene rings of moiety II, the properties of the resulting wholly aromatic polyester would be substantially different and adversely influenced as evidenced by substantially higher flow and melt temperatures resulting in significant degradation on processing." Terephthalic acid, which is a major component of the compositions of the present invention, is an example of a single divalent benzene ring.

U.S. Pat. No. 4,118,372 discloses a broad class of melt-spinnable fiber-forming synthetic anisotropic polyesters and copolyesters having a flow temperature of at least 200° C. The compositions of the present invention are not specifically exemplified in this reference. Further, the reference provides no teaching on how to obtain a liquid crystalline polyester composition having a melting point less than 365° C., a breaking elongation greater than or equal to 1.5%, and a heat distortion temperature greater than 200° C.

SUMMARY OF THE INVENTION

This invention relates to thermotropic liquid crystalline polyester compositions consisting essentially of recurring units of

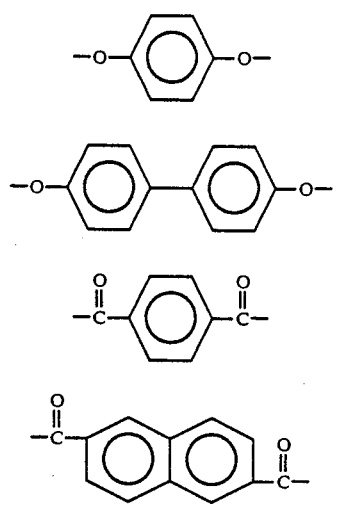

and

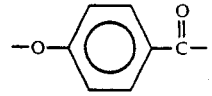

wherein the molar ratio of (I):(II) ranges from 65:35 to 40:60, wherein the molar ratio of (III):(IV) ranges from 85:15 to 50:50, wherein the molar ratio of the sum of (I) and (II) to the sum of (III) and (IV) is substantially 1:1, and wherein there are 200 to 600 moles of (V) per 100 moles of (I) plus (II). The compositions of the present invention have breaking elongations greater than or equal to 1.5%, which are indicative of a high degree of toughness, melting points less than 365° C., which minimize thermal degradation during manufacturing and processing, and heat distortion temperatures greater than 200° C., which are required in many high temperature end-use applications.

In addition, the present invention relates to glass reinforced/filled thermotropic liquid crystalline polyester compositions consisting essentially of (a) 80 to 60 weight percent of the thermotropic liquid crystalline polyester composition described in the immediately preceding paragraph and (b) 20 to 40 weight percent of at least one glass reinforcing/filling agent, with said weight percent being based upon the weight of component (a) and (b) only. These glass reinforced/filled compositions have melting points less than 365° C., breaking elongations greater than or equal to 2.0%, and heat distortion temperatures greater than 230° C.

The thermotropic liquid crystalline polyester compositions of the present invention and the glass reinforced/filled thermotropic liquid crystalline polyester compositions of the present invention can be formed into shaped and/or molded articles and are useful when it is desired to use a polymer composition having a breaking elongation greater than or equal to 1.5% (and greater than or equal to 2.0% for the glass reinforced/filled compositions), a melting point less than 365° C., and a heat distortion temperature greater than 200° C. (and greater than 230° C. for the glass reinforced/filled compositions).

DETAILED DESCRIPTION OF THE INVENTION

The present invention relates to certain thermotropic liquid crystalline polyester compositions characterized as having breaking elongations greater than or equal to 1.5%, heat distortion temperatures greater than 200° C., and melting points less than 365° C.

The present invention also relates to certain glass reinforced/filled thermotropic liquid crystalline polyester compositions containing 20 to 40 weight percent of at least one glass reinforcing/filling agent, said compositions characterized as having breaking elongations greater than or equal to 2.0%, heat distortion temperatures greater than 230° C., and melting points less than 365° C.

Thermotropic liquid crystalline polyester compositions are known in the art and are described by various terms, including "liquid crystal" and "anisotropic melts" Briefly, thermotropic liquid crystalline polyester compositions involve a parallel ordering of molecular chains in the melt. The molten state wherein molecules are of such a parallel order is often referred to as the liquid crystal state. Liquid crystalline polyesters are prepared from monomers which are generally long, flat, and fairly rigid along the axis of the molecule and have chain extending linkages that are either coaxial or parallel Whether or not a polymer is in a liquid crystal state can be determined by known procedures for determining optical anisotropy. Such procedures are described in U.S. Pat. No. 4,118,372, column 5, lines 40-68 and columns 8-9, incorporated herein by reference.

Liquid crystalline polyester compositions are known to have exceptionally high tensile strength and modulus compared to analogous polymers not having a liquid crystalline character. However, it continues to be desirous to develop liquid crystalline polyester compositions with improved properties, such as increased breaking elongation, which is a measure of toughness. It is further desirous to develop liquid crystalline polyester compositions with relatively low melting points (such as less than 365° C.) because the ease of processability of the composition increases as the melting point decreases and the potential for thermal degradation during manufacturing and processing decreases as manufacturing and processing temperatures decrease, particularly if they decrease to below 365° C.

In the present invention, thermotropic liquid crystalline polyester compositions prepared from hydroquinone, 4,4'-dihydroxybiphenyl, terephthalic acid, 2,6-naphthalenedicarboxylic acid, and 4-hydroxybenzoic acid, have been developed that have breaking elongations greater than or equal to 1.5%, melting points less than 365° C., and heat distortion temperatures greater than 200° C.

The compositions described in the immediately preceding paragraph may also contain 20 to 40 weight percent of at least one glass reinforcing/filling agent. Such glass reinforced/filled compositions have breaking elongations greater than or equal to 2.0%, melting points less than 365° C., and heat distortion temperatures greater than 230° C.

I. The Thermotropic Liquid Crystal Polyester Compositions and Glass Reinforced/Filled Versions Thereof Specifically, the thermotropic liquid crystalline polyester compositions of the present invention consist essentially of recurring units derived from (a) hydroquinone, having structure (I),

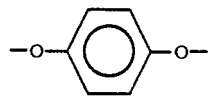

(b) 4,4'-dihydroxybiphenyl, having structure (II),

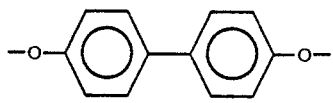

(c) terephthalic acid, having structure (III),

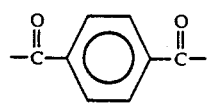

(d) 2,6-naphthalenedicarboxylic acid, having structure (IV),

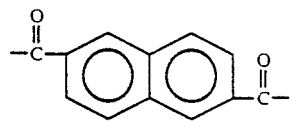

and (e) 4-hydroxybenzoic acid, having structure (V),

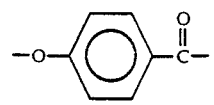

wherein the molar ratio of (I):(II) is from 65:35 to 40:60, preferably from 65:35 to 40:60, and most preferably from 60:40 to 40:60, wherein the molar ratio of (III):(IV) is from 85:15 to 50:50, preferably from 85:15 to 50:50, and most preferably from 85:15 to 60:40, wherein the molar ratio of the total of (I) and (II) to the total of (III) and (IV) is substantially 1:1, preferably 0.95-1.05:1.00, and further wherein there are 200 to 600, preferably 200 to 450, and most preferably 250 to 450 moles of (V) per 100 moles of (I) plus (II). Use of less than 200 moles of (V) may yield a liquid crystalline polyester composition having the properties described herein; however, such an amount could be undesirable for economic reasons. The compositions of the present invention are characterized as having breaking elongations greater than or equal to 1.5%, melting points less than 365° C., and heat distortion temperatures greater than 200° C.

The present invention further relates to the thermotropic liquid crystalline polyester compositions described in the immediately preceding paragraph which additionally contain 20 to 40 weight percent, preferably 20 to 35 weight percent, and most preferably 25 to 35 weight percent, of at least one glass reinforcing/filling agent, with said weight percent ranges being based upon the weight of the liquid crystalline polyester and the glass reinforcing/filling agent only. These glass reinforced/filled thermotropic liquid crystalline polyester compositions have breaking elongations greater than or equal to 2.0%, melting points less than 365° C., and heat distortion temperatures greater than 230° C.

The components of the thermotropic liquid crystalline polyester compositions of the present invention and the components of the glass reinforced/filled thermotropic liquid crystalline polyester compositions of the present invention (i.e., hydroquinone, 4,4'-dihydroxybiphenyl, terephthalic acid, 2,6-naphthalenedicarboxylic acid, 4-hydroxybenzoic acid, and glass reinforcing/filling agents) are all known in the art and are commercially available or can be prepared by techniques readily available to those skilled in the art.

Both the thermotropic liquid crystalline polyester compositions of the present invention and the glass reinforced/filled thermotropic liquid crystalline polyester compositions of the present invention have a flow temperature below 370° C., preferably below 360° C., and a melt viscosity greater than 20 Pascal.seconds, preferably greater than 25 Pascal.seconds, measured at 350° C. and 1000 sec$^{-1}$ shear rate (as measured in a constant shear rate melt rheometer using ASTM-D 3835).

In addition to the components described above, the thermotropic liquid crystalline polyester compositions of the present invention and the glass reinforced/filled liquid crystalline polyester compositions of the present invention can contain other additives, ingredients, and modifiers known to be added to liquid crystalline polyester compositions, such as, but not limited to, fillers (such as calcium metasilicate, calcium carbonate, talc, titanium dioxide, calcined aluminum silicate), catalysts, nucleating agents, colorants, carbon fiber, antioxidants, stabilizers, plasticizers, lubricants, carbon black, fire retardants, and synergists.

II. Preparation of the Liquid Crystalline Polyester Compositions and Glass Reinforced/Filled Versions Thereof The liquid crystalline polyester compositions of the present invention may be prepared from the appropriate monomers, or precursors thereof, by standard polycondensation techniques (which can include either melt, solution, and/or solid phase polymerization), preferably under anhydrous conditions and in an inert atmosphere. For example, the requisite amounts of acetic anhydride, the diols, the hydroxybenzoic acid (or optionally the acetate/diacetate derivatives of the diols/hydroxybenzoic acid), and the diacids, and optionally up to 20 percent excess acetic anhydride, are combined in a reaction vessel equipped with a stirrer, nitrogen inlet tube, and combination distillation head/condenser (to facilitate by-product removal). The reaction vessel and other equipment are dried and purged with nitrogen prior to use. The vessel and stirred contents, maintained under nitrogen, are heated during which time the ingredients react and any by-product formed (such as, for example, acetic acid) is removed via the distillation head/condenser and is collected. When the polymerization appears nearly complete, as indicated by the amount of by-product collected remaining constant, the molten mass is placed under reduced pressure (e.g. 10 mm of Hg(abs) or less) and is heated to a higher temperature, to facilitate removal of any remaining by-product and to complete the polymerization.

The melt may then be removed, cooled, and allowed to solidify prior to purification and/or subsequent processing, such as melt compounding the liquid crystalline polyester composition with a glass reinforcing/filling agent, such as in the present invention, and/or other additives. Melt compounding can be accomplished by any device capable of mixing the molten liquid crystalline polyester with other additives, such as glass. A preferred device is an extruder, either single or twin screw. Twin screw extruders may be either co-rotating or counter-rotating.

Optionally, the molten polymer may be transferred directly to an appropriate apparatus, such as a melt extruder and/or injection molding machine or spinning unit, for the preparation of articles, such as molded and/or shaped articles, fibers, films, monofilaments, and bars. Articles prepared from the compositions of the present invention may further be heat treated in accordance with U.S. Pat. No. 4,247,514 (Luise), incorporated herein by reference. By the process described in U.S. Pat. No. 4,247,514, articles prepared from liquid crystalline polymers are treated from above 140° C. to below the flow temperature of the polymer from which it was prepared for a period of time sufficient to increase energy to break in flexure by at least 25% in at least one direction of measurement. Further details on this process can be found in U.S. Pat. No. 4,247,514.

Polymerization conditions may be varied according to, e.g., the reactants employed and the degree of polymerization desired.

EXAMPLES

In the following Examples, there are shown specific embodiments of the present invention, along with embodiments outside the literal scope of the present invention that are included for comparative purposes.

In the Examples below, the following components were used:
(1) "HQ" was hydroquinone,
(2) "BP" was 4,4'-dihydroxybiphenyl,
(3) "T" was terephthalic acid,
(4) "2,6N" was 2,6-naphthalenedicarboxylic acid,
(5) "4HBA" was 4-hydroxybenzoic acid, and
(6) "Glass" was a commercially available fiber glass having an average fiber length of ⅛ inch, as determined by standard rule, calibrated to 1/16 inch.

SYNTHESIS OF LIQUID CRYSTALLINE POLYESTERS USED IN THE EXAMPLES

Preparation of the LCP of Control 1

The LCP of Control 1 was prepared as follows the reactants were charged, in a nitrogen atmosphere, into a reaction vessel equipped with a Vigreux column, condenser, and a stirrer (stir speed set between 125 and 150 rpm). The reactants initially charged into the reaction vessel for the LCP of Control 1 are detailed in Table I, below. The resultant reaction mixture was heated to reflux. Reflux began at a pot temperature between 150° C. and 155° C. The reaction mixture was refluxed between 38 and 42 minutes, at constant temperature. During the next 40 to 60 minutes, the pot temperature was slowly raised to about 220° C. and by-product acetic acid was removed, at which point vacuum was applied to reduce the pressure to about 660 mm of Hg(abs). The reaction mixture was further heated and refluxed under a pressure of about 660 mm of Hg(abs) for approximately 85 minutes after vacuum was first applied. During that time, acetic acid by-product was collected and the pot temperature was increased to about 363° C. The polymerization reaction was terminated approximately 3 hours after the components were initially charged into the reaction vessel at which time the reacting mass appeared to freeze-out.

Preparation of LCP-3

LCP-3 was prepared as follows: the reactants were charged, in a nitrogen atmosphere, into a reaction vessel equipped with a Vigreux column, condenser, and a stirrer (stir speed set between 125 and 150 rpm). The reactants initially charged into the reaction vessel for LCP-3 are detailed in Table I. below. The resultant reaction mixture was heated to reflux. Reflux began at a pot temperature between 150° C. and 155° C. The reaction mixture was refluxed between 38 and 42 minutes, at constant temperature. During the next 40 to 60 minutes, the pot temperature was slowly raised to about 220° C. and by-product acetic acid was removed, at which point vacuum was applied to reduce the pressure to about 660 mm of Hg(abs). The reaction mixture was further heated and refluxed under a pressure of about 660 mm of Hg(abs) for approximately 60 to 80 minutes after vacuum was first applied. During that time, acetic acid by-product was collected and the pot temperature was increased to about 345° C. The pressure was then reduced over the next one and one-half hours to about 1.0 mm of Hg(abs) while the stirrer speed was gradually reduced to about 75 rpm and the pot temperature was increased to about 360° C. The polymerization reaction was terminated approximately 5 hours after the components were initially charged into the reaction vessel.

Preparation of LCP-6

LCP-6 was prepared as follows: the reactants were charged, in a nitrogen atmosphere, into a reaction vessel equipped with a Vigreux column, condenser, and a stirrer (stir speed set between 125 and 150 rpm). The reactants initially charged into the reaction vessel for LCP-6 are detailed in Table I, below. The resultant reaction mixture was heated to reflux. Reflux began at a pot temperature between 155° C. and 160° C. The reaction mixture was refluxed between 38 and 42 minutes, at constant temperature. During the next 40 to 60 minutes, the pot temperature was slowly raised to about 242° C. and by-product acetic acid was removed, at which point vacuum was applied to reduce the pressure to about 660 mm of Hg(abs). The reaction mixture was further heated and refluxed under a pressure of about 660 mm of Hg(abs) for approximately 20 to 50 minutes after vacuum was first applied. During that time, acetic acid by-product was collected and the pot temperature was increased to between 320° C. and 360° C. The pressure was then reduced over the next one to two hours to about 1.0 mm of Hg(abs) while the stirrer speed was gradually reduced to about 20 rpm and the pot temperature was increased to about 370° C. The polymerization reaction was terminated approximately 4–5 hours after the components were initially charged into the reaction vessel.

Preparation of LCP 1, 2, 4, 5, 7–9 and the LCP of Control 2

In the Examples below, LCP 1, 2, 4, 5, 7–9 and the LCP of Control 2 were prepared by substantially the same method. For each of these LCP compositions, the reactants were charged, in a nitrogen atmosphere, into a reaction vessel equipped with a Vigreux column, condenser, and a stirrer (stir speed set at about 50 rpm). The reactants initially charged into the reaction vessel for each of these LCP compositions are detailed in Table I, below. The resultant reaction mixture was heated to reflux and then was refluxed for about 60 minutes, during which time the pot temperature was held constant at about 170° C. During the next approximately 240 minutes, the pot temperature was slowly raised to about 370° C. and by-product acetic acid was removed, at which point vacuum was applied to reduce the pressure to about 200 mm of Hg(abs). The pressure was then reduced over the next approximately 120 minutes to about 5–10 mm of Hg(abs) while by-product acetic acid was removed and the stirrer speed was reduced to about 30 rpm and the pot temperature was maintained at about 370° C. The polymerization reaction was terminated approximately 7 hours after the components were initially charged into the reaction vessel.

TABLE I

Amount of Reactants Charged Into Reaction Vessel

| Example | HQ (g) | BP (g) | T (g) | 2,6-N (g) | 4HBA (g) | Acetic Anhydride (g) |
|---|---|---|---|---|---|---|
| Control 1 | 106.58 | 60.1 | 150.1 | 83.7 | 570.4 | 718.8 |
| LCP 1 | 66.1 | 74.5 | 116.3 | 64.9 | 442.0 | 573.4 |
| LCP 2 | 55.1 | 93.1 | 116.3 | 64.9 | 414.4 | 551.3 |
| LCP 3 | 54.63 | 138.6 | 144.2 | 80.5 | 548.2 | 690.9 |
| LCP 4 | 55.1 | 93.1 | 116.3 | 64.9 | 442.0 | 573.4 |
| LCP 5 | 55.1 | 93.1 | 116.3 | 64.9 | 483.4 | 606.5 |
| LCP 6 | 60.5 | 102.3 | 127.7 | 71.3 | 606.9 | 739.6 |
| LCP 7 | 48.0 | 81.2 | 101.4 | 56.6 | 542.0 | 625.0 |
| LCP 8 | 55.1 | 93.1 | 132.9 | 43.2 | 442.0 | 573.4 |
| LCP 9 | 55.1 | 93.1 | 141.2 | 32.4 | 442.0 | 573.4 |
| Control 2 | 55.1 | 93.1 | 166.1 | 0.0 | 442.0 | 573.4 |

COMPOUNDING OF THE LCP AND MOLDING TEST BARS

Unless otherwise specified, compounding of LCP compositions in the Examples below with any other component, including Glass, was done in a 28 mm Werner and Pfleiderer twin-screw extruder having a zone with conventional conveying elements, a zone with kneading or mixing elements, and a low pressure zone with venting under vacuum of any volatiles from the polymer melt, and a die. As the compounded LCP compositions exited the die, they were quenched with a water spray and cut into pellets with a conventional strand cutter. The extruder barrel and die temperatures were maintained at about 290° C.–320° C. and 300°–320° C., respectively. Prior to molding the pellets, the pellets were dried overnight for approximately 16 hours in a vacuum oven with $N_2$ purge at 100°–130° C. The dried polymer pellets were molded into standard test bars, as required per ASTM D638 for determining tensile properties, on either a 1½ oz Arburg molding machine or a 6 oz HPM molding machine with barrel temperatures of 330°–360° C. and injection pressures of 4000–6000 psi.

TESTS

The LCP compositions of the Examples below were tested to determine melting point ($T_m$), breaking elongation, tensile strength, and heat distortion temperature (HDT).

$T_m$ was determined using a 25° C./minute heating rate with a Du Pont Model 1090 Dual Sample Differential Scanning Calorimeter by ASTM D2117. Tensile strength and elongation at break were determined in accordance with ASTM D638. HDT was determined in accordance with ASTM D648.

TEST RESULTS

The test results for each LCP composition prepared as described above are detailed in Table II, below. The LCP composition of Control 1 was prepared from HQ, BP, T, 2,6N, and 4HBA, but had an HQ/BP molar ratio of 75/25. The $T_m$ for the LCP composition of Control 1 was significantly greater than 365° C.; specifically, it was 383° C. The breaking elongation for the LCP composition of Control 1 containing 30% Glass was only 0.96%.

LCP 1, in contrast, was the same as the LCP composition of Control 1 except that the molar ratio of HQ/BP was 60/40. The $T_m$ for LCP 1 was less than 365° C.; specifically, it was 346° C. The breaking elongation of LCP 1 composition containing 30% Glass was 2.7%, which is a significant increase from the 0.96% breaking elongation of the LCP composition of Control 1 which also contained 30% Glass. Similarly, LCP 2 and LCP 3, which were each the same as the LCP composition of Control 1 except that the molar ratio of HQ/BP for LCP 2 was 50/50 and the molar ratio of HQ/BP for LCP 3 was 40/60, each had a $T_m$ of 334° C. The breaking elongation for LCP 2 containing 30% Glass was 2.4% and the breaking elongation for LCP 3 containing 30% Glass was 2.9%.

The $T_m$ for LCP 4 through LCP 7, each of which was prepared from HQ, BP, T, 2,6N, and 4HBA, was less than 365° C. Further, the breaking elongation for each of LCP 4 through LCP 7, all of which contained 30% Glass, was greater than 2.0%. The breaking elongation for LCP 6 without Glass was 1.5%.

LCP 8 and LCP 9, each of which was prepared from HQ, BP, T, 2,6N, and 4HBA and each of which contained 30% Glass, both had a breaking elongation greater than 2.0%. The LCP composition of Control 2 was prepared only from HQ, BP, T, and 4HBA. The LCP composition of Control 2 did not contain a 2,6N component. As a result, the breaking elongation of the LCP composition of Control 2, which contained 30% Glass, was only 0.8%

LCP 1 through LCP 9, each of which, unless specified otherwise, contained 30% Glass, further all had heat distortion temperatures greater than 230° C. LCP 6, without Glass, had a heat distortion temperature of 261° C.

-continued (d) structure (IV).

(IV)

and (e) structure (V),

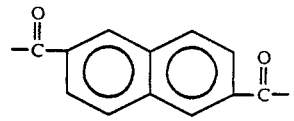

(V)

wherein the molar ratio of (I):(II) ranges from 65:35 to 40:60, wherein the molar ratio of (III):(IV) ranges from 85:15 to 50:50, wherein the molar ratio of the total of (I) and (II) to the total of (III) and (IV) is substantially 1:1, and further wherein there are 200 to 600 moles of (V) per 100 moles of (I) plus (II).

2. A glass reinforced/filled thermotropic liquid crystalline polyester composition consisting essentially of

TABLE II

| Example | Monomers | Monomer Molar Ratios | $T_m$ (°C.) | 30% Glass Reinforced Compositions | | |
|---|---|---|---|---|---|---|
| | | | | HDT (°C.) | Breaking Elongation (%) | Tensile Strength (kpsi) |
| Control 1 | HQ/BP-T/2,6N-4HBA | 75/25–70/30–320 | 383 | 254 | 0.96 | 6 |
| LCP 1 | HQ/BP-T/2,6N-4HBA | 60/40–70/30–320 | 346 | 258 | 2.7 | 16.4 |
| LCP 2 | HQ/BP-T/2,6N-4HBA | 50/50–70/30–300 | 334 | 257 | 2.4 | 13.7 |
| LCP 3 | HQ/BP-T/2,6N-4HBA | 40/60–70/30–320 | 334 | 249 | 2.9 | 15.6 |
| LCP 4 | HQ/BP-T/2,6N-4HBA | 50/50–70/30–320 | 336 | 239 | 2.1 | 17.9 |
| LCP 5 | HQ/BP-T/2,6N-4HBA | 50/50–70/30–350 | 342 | 254 | 2.6 | 18.2 |
| LCP 6 | HQ/BP-T/2,6N-4HBA | 50/50–70/30–400 | 349 | 262 | 2.2 | 16.6 |
| LCP 7 | HQ/BP-T/2,6N-4HBA | 50/50–70/30–450 | 352 | 259 | 2.2 | 17.5 |
| LCP 8 | HQ/BP-T/2,6N-4HBA | 50/50–80/20–320 | 345 | 263 | 2.1 | 18 |
| LCP 9 | HQ/BP-T/2,6N-4HBA | 50/50–85/15–320 | 351 | 267 | 2.1 | 14.8 |
| Control 2 | HQ/BP-T/2,6N-4HBA | 50/50–100/0–320 | 361 | 298 | 0.8 | 7.4 |
| LCP 6 | HQ/BP-T/2,6N-4HBA | 50/50–70/30–400 | 349 | 261* | 1.5* | 17.2* |

*Composition did not contain Glass

We claim:

1. A thermotropic liquid crystalline polyester composition consisting essentially of recurring units of (a) structure (I),

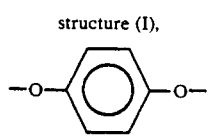

(I)

(b) structure (II),

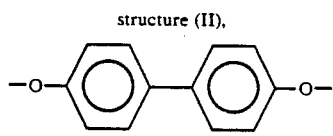

(II)

(c) structure (III),

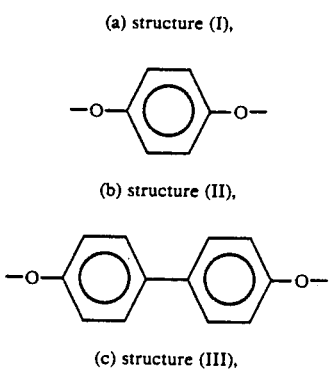

(a) 80 to 60 weight percent of a liquid crystalline polyester component consisting essentially of recurring units of structure (I),

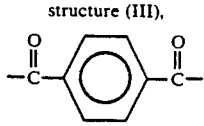

(I)

structure (II),

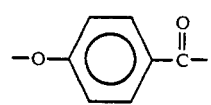

(II)

structure (III), (III)

structure (IV),

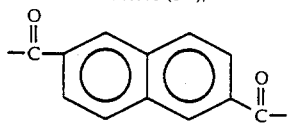

and structure (V),

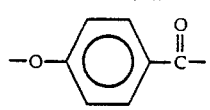

wherein the molar ratio of (I):(II) ranges from 65:35 to 40:60, wherein the molar ratio of (III):(IV) ranges from 85:15 to 50:50, wherein the molar ratio of the total of (I) and (II) to the total of (III) and (IV) is substantially 1:1, and further wherein there are 200 to 600 moles of (V) per 100 moles of (I) plus (II) and (b) 20 to 40 weight percent of at least one glass reinforcing/filling agent component, wherein the weight percents are based upon the weight of the component (a) and the component (b) only.

3. The composition of claims 1 or 2 wherein the molar ratio of (I):(II) ranges from 65:35 to 40:60, the molar ratio of (III):(IV) ranges from 85:15 to 50:50, and wherein there are 200 to 450 moles of (V) per 100 moles of (I) plus (II).

4. The composition of claims 1 or 2 wherein the molar ratio of (I):(II) ranges from 60:40 to 40:60, the molar ratio of (III):(IV) ranges from 85:15 to 60:40, and wherein there are 250 to 450 moles of (V) per 100 moles of (I) plus (II).

5. The composition of claims 1 or 2 further comprised of at least one of fillers, catalysts, nucleating agents, colorants, carbon fiber, antioxidants, stabilizers, plasticizers, lubricants, carbon black, fire retardants, and synergists.

6. The composition of claim 5 wherein the filler is selected from the group consisting of calcium metasilicate, calcium carbonate, talc, titanium dioxide, and calcined aluminum silicate.

7. Articles formed from the composition of claim 1.

8. An article of claim 7 selected from the group consisting of molded articles, shaped articles, films, monofilaments, and fibers.

9. An article of claim 7 that is heat treated at a temperature from above 140° C. to below the flow temperature of the polymer from which the shaped article is prepared for a period of time sufficient to increase energy to break in flexure by at least 25% in at least one direction of measurement.

10. Shaped or molded articles made from the composition of claim 2.

11. A shaped or molded article of claim 10 that is heat treated at a temperature from above 140° C. to below the flow temperature of the polymer from which the shaped article is prepared for a period of time sufficient to increase energy to break in flexure by at least 25% in at least one direction of measurement.

* * * * *

UNITED STATES PATENT AND TRADEMARK OFFICE
CERTIFICATE OF CORRECTION

PATENT NO. : 5,110,896
DATED : MAY 5, 1992
INVENTOR(S) : MARION GLEN WAGGONER
MICHAEL ROBERT SAMUELS

It is certified that error appears in the above-identified patent and that said Letters Patent is hereby corrected as shown below:

In column 10, line 48, delete "2117" and insert in place thereof --D3418-82 (measured on the first heat)--.

Signed and Sealed this

Twenty-fourth Day of August, 1993

Attest:

BRUCE LEHMAN

Attesting Officer   Commissioner of Patents and Trademarks